April 21, 1964  A. D. STAUFFER  3,129,549
POWER MOWING MACHINE
Original Filed Sept. 25, 1959  3 Sheets-Sheet 1

INVENTOR.
Andrew Dillon Stauffer
BY
William E. Nobbe
ATTORNEY

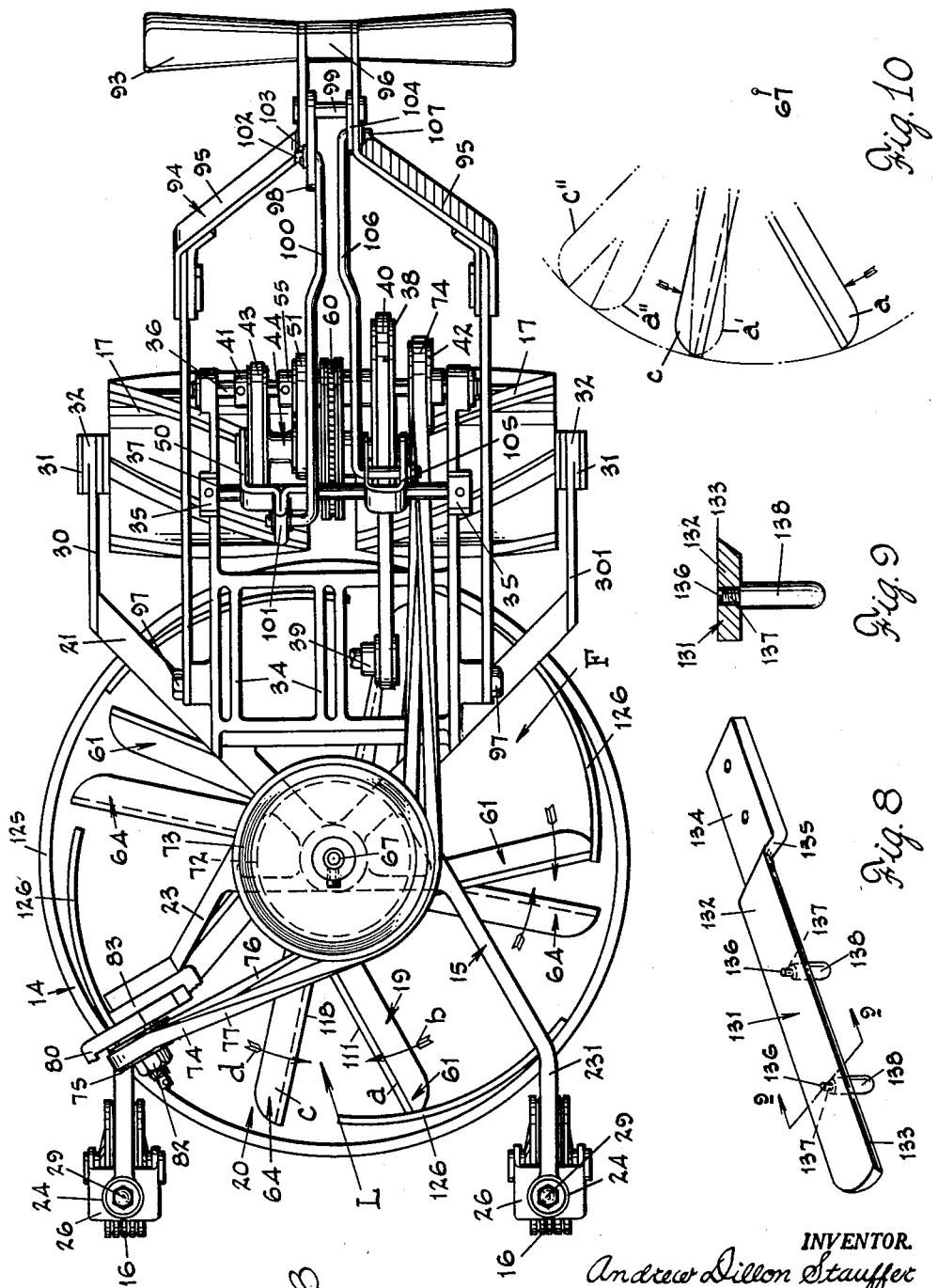

April 21, 1964     A. D. STAUFFER     3,129,549
POWER MOWING MACHINE
Original Filed Sept. 25, 1959     3 Sheets-Sheet 3
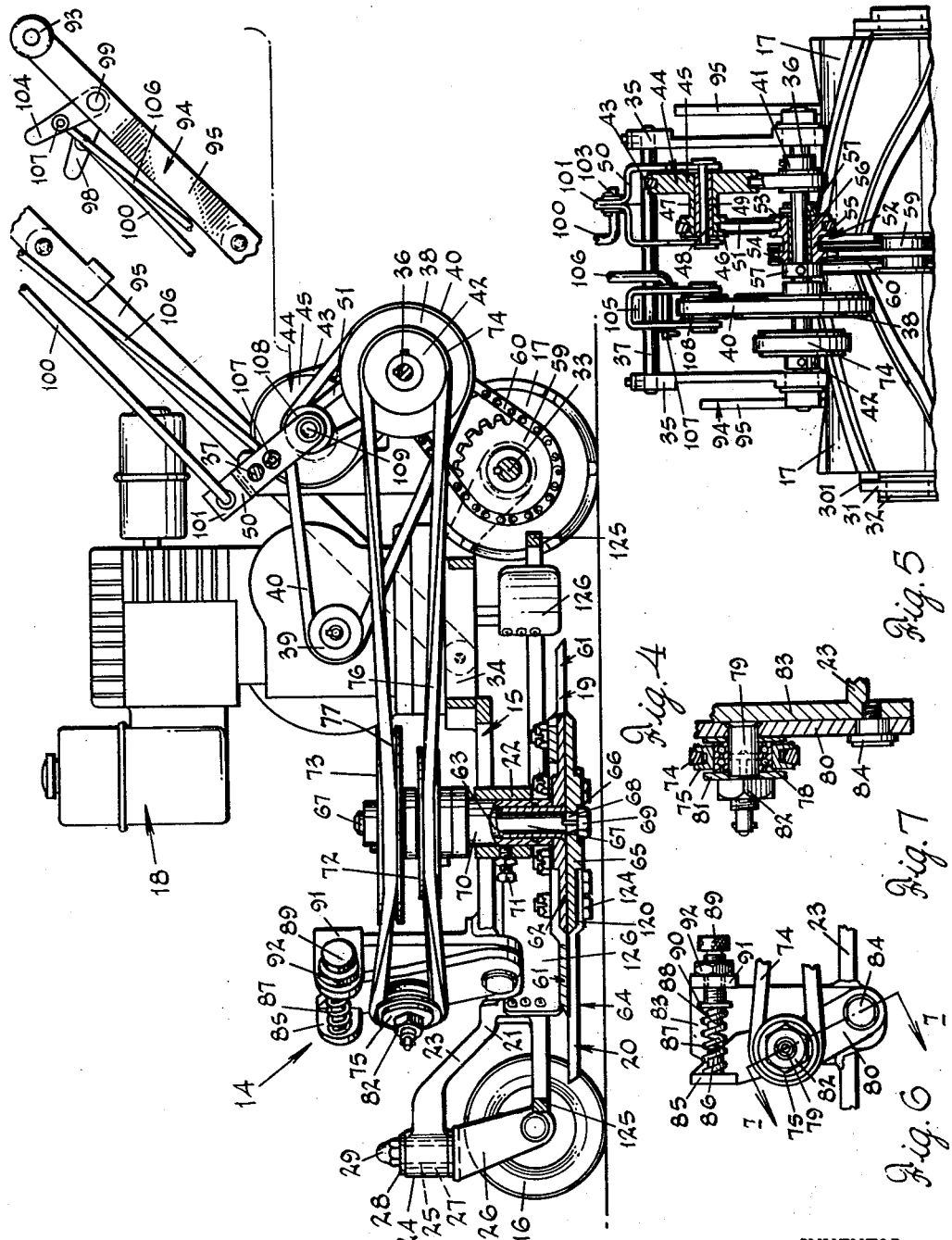
INVENTOR.
Andrew Dillon Stauffer
BY
William E. Nobbe
ATTORNEY

United States Patent Office 3,129,549
Patented Apr. 21, 1964

3,129,549
POWER MOWING MACHINE
Andrew Dillon Stauffer, R.F.D. 3, Columbus Grove, Ohio
Continuation of application Ser. No. 842,403, Sept. 25, 1959. This application Jan. 29, 1962, Ser. No. 172,041
7 Claims. (Cl. 56—25.4)

The present invention relates broadly to power mowing machines and is more particularly concerned with an improved cutter construction adapted to produce a scissor type of severing action.

This application is a continuation of application Serial No. 842,403, filed September 25, 1959, now abandoned.

A primary object of the invention is to provide a mowing machine having improved cutting means for grass and like growths and which further serves to reduce the cut portions of the grass or like growths into highly comminuted particles.

Another object of the invention is to provide, in a mowing machine of the above character, a plurality of cutter elements adapted to rotate in shearing relation to one another in a horizontally disposed plane so as to produce a multiplicity of scissor-like cutting actions whereby the grass or other growths severed in the leading area of the shearing or cutting action are further reduced in size in a following area of such action.

Another object of the invention is to provide, in a mowing machine of the above character, two series of cutter elements that are rotated in opposite directions and preferably at different rates of speed with respect to one another to produce a shearing of grass or like growths by the coaction of the blades of one series of cutter elements with the blades of a second series of cutter elements; the repeated shearing actions of the first series of blades occurring with subsequent blades of the second series of cutter elements in a circularly described path of action.

Another object of the invention is to provide, in a mowing machine of the above character, means in the form of arcuately shaped shields disposed in the path of the cut grass to direct the cuttings back into the path of the cutter blades to effect a further reduction in the size of the cuttings.

A further object of the invention is to provide, in a mowing machine of the above character, means in the form of substantially vertically disposed fingers carried by the cutter blades which operate as raking elements upon rotation of said cutter blades to lift the grass or like growths upwardly into the path of the cutter blades.

Other objects and advantages of the invention will become more apparent during the course of the following description when taken in connection with the accompanying drawings.

In the drawings wherein like numerals are employed to designate like parts throughout the same:

FIG. 3 is a top view of the mowing machine;

FIG. 4 is a side view of the mowing machine, parts thereof being shown in section;

FIG. 5 is a fragmentary rear elevational view with parts broken away and shown in section;

FIG. 6 is a detail view of a tensioning device for the drive belt of the cutter elements;

FIG. 7 is an enlarged transverse sectional view taken on line 7—7 of FIG. 6;

FIG. 8 is a perspective view of a modified form of cutter element;

FIG. 9 is an enlarged cross sectional view taken on line 9—9 of FIG. 8; and

FIG. 10 is a diagrammatic representation of the shearing action produced by two oppositely rotating cutter blades.

Figure 1:
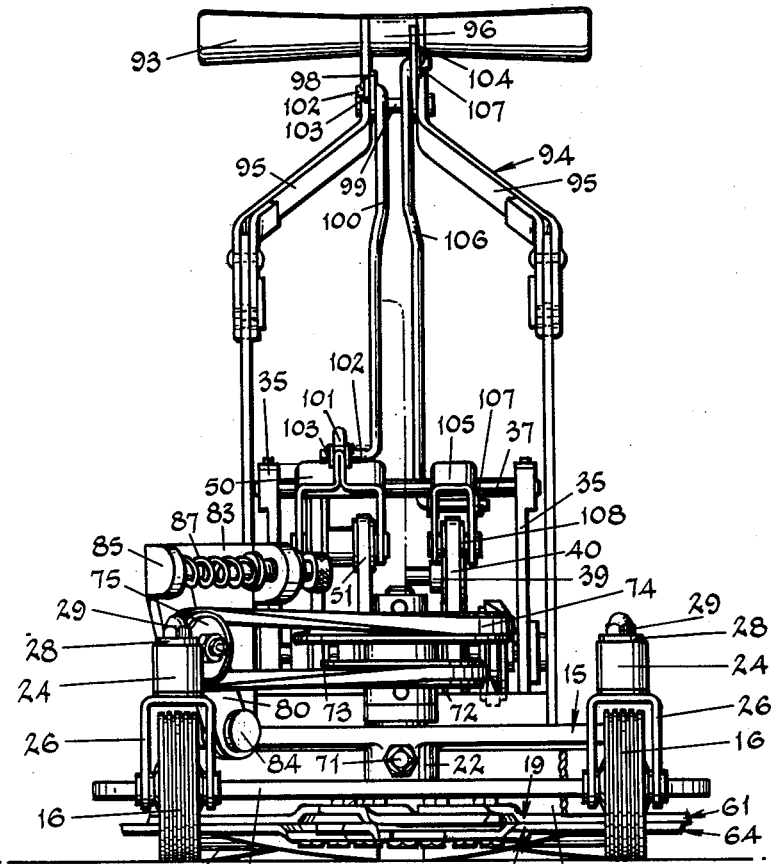
FIG. 1 is a front view of a power mowing machine constructed in accordance with this invention.

Generally stated, the mowing machine, designated in its entirety by the numeral 14, comprises a base framework 15 that is movably supported by caster-type wheels 16 at its forward end and by tractor-type wheels or rollers 17 at its rear end. A suitable source of power, such as a conventional gasoline operated motor 18 (FIG. 4), is mounted on the framework 15 and is adapted, through suitable driving belts, to propel the machine 14 bodily forwardly while simultaneously operating a cutting assembly having cutter elements which are generally designated by the numerals 19 and 20.

More particularly, the base framework 15 is of so-called spiderwork formation 21 emanating from a vertically disposed center column 22. This spiderwork, which is an integrally formed unit, includes forwardly directed, substantially horizontally disposed arms 23 and 231 respectively, the outer ends of which are formed as hubs 24 for receiving therethrough the vertically disposed axles 25 of caster brackets 26 for the caster wheels 16. In order that the caster wheels 16 will be freely swingable about the vertical axes of the axles 25, the hubs 24 are fitted with sleeve or other types of bearings 27 in which the axles 25 are journaled and retained by means of washers 28 and nuts 29.

The spiderwork frame also includes rearwardly directed horizontal arms 30 and 301, the extremities 31 of which are equipped with bearings 32 for rotatably supporting the axle shaft 33 for the rear rollers 17. The arms 30 and 301 are also formed to include rails 34, which constitute a horizontal platform upon which the motor 18 is mounted, and vertically disposed posts 35 supporting horizontal shafts 36 and 37 on which several operable drive members are mounted as will be more fully hereinafter described.

With particular reference to FIGS. 3, 4 and 5, the shaft 36 is driven by means of drive pulleys 38 fixedly mounted thereon and operably connected to the drive pulley 39 of the motor 18 by a belt 40 trained thereabout. Pulley 38, on driving shaft 36, also transmits power to pulleys 41 and 42 likewise fixed thereon. The pulley 41 drives through belt 43 a double pulley 44 which consists of the two pulley sections 45 and 46 that are integrally interjoined by a hub 47. The hub 47 is freely rotatable on a shaft 48 by means of sleeve bearing 49 (FIG. 5). The shaft 48 is secured at its ends in a yoke member 50 that is pivotally mounted on the shaft 37 for purposes to be more fully hereinafter described.

The pulley section 45 constitutes a secondary drive for the rear supporting rollers 17 and is of considerably larger diameter than the pulley 41 to reduce the operating speed of the rollers 17 as transmitted to the shaft 36 and pulley 41 from the motor 18. On the other hand, the pulley section 46 is coupled by belt 51 to a gear drive unit 52 comprised of a pulley section 53 and sprocket 54 integrally formed with a common hub 55 that is freely rotatable on shaft 36 by means of sleeve bearing 56 (FIG. 5). Since the drive unit 52 is intended to rotate at a speed independent of the speed at which the shaft 36 is rotated, it is maintained thereon by means of fixed collars 57.

The pulley section 53 is larger in diameter than the pulley 46 so that when driven by the belt 51, trained thereabout, it will be driven at a reduced rate of speed. Likewise, the sprocket 54 is considerably smaller than sprocket 59 fixedly mounted on the axle shaft 33 and with which it is operably connected by a chain belt 60. The purpose of this train of driving inter-connections is to reduce the rate of speed at which the shaft 36 is driven by the motor 18 to a rate of speed at the sprocket 59 that is commensurate with the desired rate of forward progress of the mowing machine or the normal walking pace of the operator. On the other hand, the pulley 42 on shaft 36 is adapted to drive the cutting assembly comprised of the elements 19 and 20 at a relatively high speed.

Figure 2:
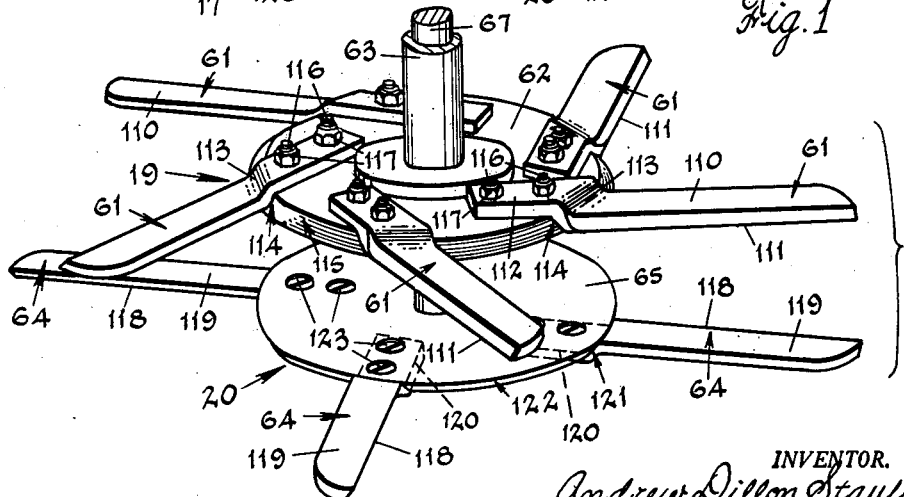
FIG. 2 is an enlarged perspective view of the cutting assembly of the mowing machine.

More particularly, the pulley 42 is operatively connected to the cutting assembly so as to rotate the cutter element 19 in one direction while driving the cutter element 20 simultaneously in an opposite direction. Likewise, for purposes to be hereinafter more fully disclosed, the cutter element 19 is caused to rotate at a predeterminedly greater rate of speed than the cutter element 20. As viewed in FIGS. 2 and 3, it will be seen that the cutter element 19 is equipped with five radially disposed blades 61 that are carried at their inner ends by a mounting disc 62 having a centrally disposed hollow hub 63. On the other hand, the cutter element 20 is provided with four similar blades 64, carried on a mounting disc 65. The disc 65, as shown in FIG. 4, is provided with an axially disposed conical opening within which is received the tapered end portion 66 of a vertically disposed shaft 67. A substantially rigid connection is provided between the disc 65 and the shaft 67 by a key 68 and nut 69 threaded into the end of said shaft.

The shaft 67 is rotatably fitted in the hollow hub 63 which in turn is received in a bearing sleeve 70 secured in the hollow column 22 of framework 15. By means of a set-screw 71, the sleeve 70 can be fixedly secured in relation to the column and likewise may be adjusted vertically when desired. At the upper end of the hollow hub 63 and opposite to the mounting disc 62 on which the cutter element 19 is carried, a pulley 72 is secured above the sleeve 70, while fixed to the shaft 67, above pulley 72, is a pulley 73. The diameter of the pulley 72 is comparatively smaller than the diameter of pulley 73 to the end that when the pulleys are operatively driven from the pulley 42, the pulley 72 and consequently the cutter element 19 will revolve at a proportionately greater rate of speed than pulley 73 and cutter element 20. While it has been found advantageous to operate the cutter element 19 more rapidly than the cutter element 20, this invention also contemplates the use of pulleys 72 and 73 of the same diameter so that the cutter elements will be driven at the same speed.

The pulleys 72 and 73 are adapted to drive the cutter elements in opposite directions. To accomplish this, there is provided an endless belt 74 trained about the pulley 42 and a tensioning or idler pulley 75. The lower flight 76 of belt 74, traveling in one direction, engages and drives the pulley 72 and then having passed about the idler pulley 75 the belt forms a return flight 77 which passes about the pulley 73 thereby driving the same in the opposite direction of rotation.

As seen in FIGS. 6 and 7, the idler pulley 75 is supported by a roller bearing 78 on a fixed shaft 79 mounted in a tensioning plate 80. The bearing 78 is contained between spaced washers 81 and secured on the shaft 79 by a nut 82. The plate 80 is pivotally mounted at its lower end on a bracket 83, forming an integral part of one forwardly directed arm 23, by a stud shaft 84 threaded at one end into the bracket. The upper end of the plate 80 is formed with a laterally directed ear 85 having a pin 86 centrally located therein. Loosely fitted over the pin 86 is one end of a coil spring 87 in abutting relation to the adjoining surface of the ear. The opposite end of the spring is carried on the reduced end 88 of an adjusting hand screw 89, a washer 90 being provided as the bearing surface. The hand screw 89 is threaded through an ear portion 91 formed on the bracket 83 and outwardly thereof is equipped with a lock-nut 92.

It will be apparent from the above that compression of the spring 87 upon inward threading of the hand screw 89 will effect a tensioning of the belt 74 as the plate 80 is caused to carry the pulley 75 an adjusted distance outwardly. The purpose of this tensioned mounting of the idler pulley 75 is not only to maintain the belt 74 adequately taut to drive the pulleys 72 and 73, but more importantly to insure that the belt 74 will continue to run freely despite the stoppage of either pulley 72 or 73 due to collision of the associated cutter elements with unusual obstructions in the surface over which the mowing machine is traveling. In such event, the increased friction of the belt on either pulley 72 or 73 will cause the belt to "strain" about the pulley 75 and thereby act to pull the same inwardly against the action of the spring 87.

In order that the mowing machine can be bodily directed in any desired direction by the operator, handle grips 93 are provided at the outer end of a handle 94. This handle is formed by suitably shaped bars 95 interjoined with the grips 93 by a long bolt or the like passed through the grips, the outer ends of the bars 95 and a spacer 96 therebetween. Each of the bars 95 is pivotally mounted at its inner end on the rails 34 by means of a bolt 97. Likewise, tractive rotation of the rollers 17, as operatively driven from the shaft 36, can be controlled at the handle 94 and in the same manner, the pulley 42 can be caused to drive the pulleys 72 and 73. For this purpose, a lever 98 is pivotally mounted by shaft 99 on the bars 95 and is connected by an operating rod 100 to an extension 101 of the yoke which is swingably mounted on shaft 37. As herein shown, the opposite ends of the rod 100 are bent at substantially right angles as at 102 and connected to the lever 98 and yoke 50 by suitable cotter pins and washers 103 or the like.

Upon forward movement of the lever 98 by the operator, the operating rod 100 will cause the yoke 50 to rotate about its axis on the shaft 37 and thereby increase the tension of belt 43 trained about pulleys 41 and 45. This action will be transmitted as a driving force to the sprocket 59 on axle 33 and consequently to the ground rollers 17.

A second lever 104 provided on shaft 99, is connected to a U-shaped yoke 105 swingably mounted on shaft 37, by an operating rod 106, being secured thereto by cotter pins 107. The yoke 105 rotatably supports a pulley 108 on shaft 109 and about which one flight of the belt 40 is trained between pulleys 38 and 39. Accordingly, when the lever 104 is pulled rearwardly by the operator, the yoke 105 will be swung on shaft 37 and the pulley 108 thus caused to tension the belt 40 to cause rotation of pulley 42 to drive the belt 40 and the cutter elements 19 and 20. Oppositely directed motions of the levers 98 and 104 will, of course, serve to reduce the taut conditions of the belts 40 and 43 with resultant stopping of the ground rollers 17 and idling of the cutter elements 19 and 20.

As previously described, the blades 61 of the cutter element 19 are arranged on the disc 62 to cooperate with the blades 64 of the cutter element 20 to produce a definite shearing action. This is accomplished by the positioning of the discs 62 and 65 one above the other in contacting relationship and with the respective blades 61 and 64 being projected outwardly from the discs in shearing relationship to one another. The upper blades 61 being five in number and preferably driven at a more rapid rate of rotation and in an opposite direction to the four lower blades 64, are adapted to effect a typical scissor or shearing action therewith. And since the co-action between each of the blades 61 and blades 64 is carried out in rapidly repeated sequences throughout the circular path through which they rotate, the blades of grass or like growth will be cut in the leading area, as the mowing machine moves forwardly. Upon continued forward movement of the machine, the severed grass blades will again be caught between the counter-rotating cutter blades which operate to completely chop or shear the grass into small, comminuted particles which are easily received into the standing grass blades. This will result in a lawn of smoother appearance, particularly since the grass blades are severed while being gathered or engaged by the blades in a plane substantially perpendicular to their plane of rotation.

To establish a definite cutting or shearing relationship between the blades 61 and 64, the blades 61 are positioned at an angle to a diametric line through the axis of the disc 62, while the blades 64 are arranged so that the major longitudinal axes thereof are substantially parallel with an axial diametric line through the disc 65.

The blades 61 and 64 are of the same general formation which is substantially Z-shape. More especially, the blades 61 include an outwardly directed cutter portion 110, having a sharpened leading cutting edge 111, and an upwardly offset mounting portion 112 which are integrally interjoined by an angularly disposed web 113. The web 113 has a bottom surface 116 which interfits with the beveled peripheral edge 115 of the disc 62. The surface 114 is curved to conform to the curvature of the disc 62 and serves to locate the sharpened edge 111 of the cutting portion 110 in a plane parallel to the undersurface of the disc 62 and at the desired shear angle. Each of the blades 61 is secured to the disc by bolts 116 and nuts 117, the heads of the bolts being countersunk in the bottom of the disc to afford a smooth undersurface.

The blades 64 include the outwardly directed cutter portions 119, the cutting or sharpened edges 118 of which are located in the plane of the upper surface of the disc 65. The cutter portion 119 and mounting end 120 of each cutter blade 64 are disposed in offset relation by the angularly disposed web 121. In this instance, the web 121 of each blade 64 is adapted to interfit with the beveled peripheral edge 122 of the disc 65 but is formed substantially at a right angle to the longitudinal axis of the blade. The blades 64 are secured at their inner ends 120 to the undersurface of the disc 65 by means of countersunk bolts 123 and nuts 124.

Accordingly, the sharpened leading cutting edges 111 of the blades 61 will be located in substantially the same plane as the sharpened cutting edges 118 of the blades 64 so that as the blades approach and traverse each other, an efficient shearing or scissor-like action will be produced. Now, with reference to FIG. 3 it will become apparent that in the leading area L of the cutting action, the coaction of the upper cutter blade *a*, rotating in the direction of the arrow, designated by the letter *b*, and the lower cutter blade *c*, rotating in the direction of the arrow, designated by the letter *d*, will gather the up standing growth of grass blades therebetween and, at the blade *a* traverses the blade *c*, they will completely sever the grass cleanly and without snagging or slashing the same.

This shearing or scissor-like cutting action is more clearly illustrated diagrammatically in FIG. 10 in which one of the cutter blades *a* is shown in full line position and also in a forwardly advanced broken line position, designated by the letter *a'*. As the cutter blade *a* advances to position *a'* it coacts with cutter blade *c* moving in the opposite direction to effect a shearing or scissor-like cutting action as the cutting edges of the two blades traverse one another. The shearing of the grass is produced not only by the counter rotation of the cutter blades *a* and *c* but also by the fact that the blade *a* is moving at a relatively higher rate of speed than the blade *c* which is rotating in the opposite direction. Due to the differential in speed of movement between the cutter blades *a* and *c* the area in which any given pair of blades will produce a shearing action will be progressively shifted in a circular path and in a clockwise direction. Thus, as the blade *a* makes one complete revolution and reaches position *a''*, where it again coacts with blade *c* the blade *c* will have moved in a counter-clockwise direction to position *c''* and will be again engaged by blade *a* before it has completed a full revolution. In this way, the successive cutting action of any two blades *a* and *c* will be constantly shifted circumferentially in a clockwise direction and in a step-by-step manner. This will, of course, also be true in the case of the remaining cutter blades 61 and 64 which will result in the progressive cutting of a large number of relatively small areas of grass in a rapidly occurring multiplicity of shearing actions, the positions of which are being constantly shifted. In other words, as each cutter blade 61 makes one complete revolution it will engage all of the cutter blades 64, and during its next revolution will also contact all of the cutter blades 64, but before the blades 64 make a complete revolution. This will continue throughout the mowing operation so that the areas of cutting will be constantly shifted in a clockwise direction circumferentially of the cutting assembly. This results in an improved mowing or cutting action since the grass or like growths will be leveled entirely across the width of the circular pattern described by the blades 61 and 64, and the remaining stems of the cut blades are cleanly severed and not raggedly slashed at a variety of angles. This promotes a regularity of growth and the maintenance of a lawn having a smooth appearance.

However, what is more important the grass blades cut in the leading area of the cutting action are subjected to further reduction in size upon falling downwardly onto the rotating blades as the mover moves forwardly. This is particularly noticeable in the following area F of the cutting action with the result that the grass blades are subjected to further cutting by the shearing actions of the blades 61 and 64 and actually become chopped into such small particles that they readily re-enter the remaining stems of grass and disappear.

In order that the blades 61 and 62 will be protected from damage by accidental contact with walls trees or large stones, a guard ring 125 is mounted on the spiderwork 23 and encircles the cutting assembly. Also to direct the flying cut grass back into the path of the rotating blades, a plurality of vertically disposed plate-like shields 126 are carried by the guard ring 125. The shields 126 are arcuately shaped in plan, with one end of each shield being secured to the guard ring and the other end spaced inwardly from said guard ring so that the shields are eccentrically positioned with respect to the axis of rotation of the cutter blades to direct the grass cuttings back into the path of the cutter blades. Since there is to be expected a certain amount of outwardly directed air current, created by centrifugal energy of the rotating cutter elements, the shields 126 are adapted to interrupt the tendency of the severed grass particles to move with such air currents and, by reason of their accentric positioning, divert the particles, while they are falling, back into the area of the cutter elements. Thus, as previously stated in connection with the falling of the cut grass into the following area F, this further inward diversion of the cut grass by the shields 126 into the active cutting or mowing area increases and improves the rate at which the cut grass is further reduced in size.

In actual practice, the efficient cutting action of the cutter elements of the mowing machine, as herein described, substantially eliminates the necessity for a housing to be provided as is the case with many prior art mowers or grass cutting machines. However, should it be desirable, for one reason or another, to enclose the blades, this may be done by the use of a suitable housing or shielding member as is well known.

A further improvement which is adapted for use with the moving machine of this invention is disclosed in FIG. 8 wherein each lower blade may be equipped with downwardly directed metal pegs or fingers. For this purpose, a modified form of cutter blade, designated by the numeral 131, is similar to the blade 64 in that it is formed with an outwardly directed cutter portion 132, having a sharpened leading cutting edge 133 and a downwardly offset mounting portion 134 which are integrally interjoined by an angularly disposed web 135. The cutter portion 132 is provided with spaced tapped holes 136 in which are received the threaded ends 137 of metal pegs 138 (FIG. 9). The pegs 138 are thus directed downwardly such that when the blades are operatively driven, the fingers or pegs 138 will be rapidly carried circularly through the grass and operate as raking elements to engage angularly directed grass blades but more especially to lift the stems of weeds into the path of the cutter elements. Ordinarily, certain types of weeds send forth root or stem-like tentacles that project along the surface of the ground but usually not directly into the standing growth of grass. Accordingly, the additional use of the fingers 138 when the modified blades 131 have been substituted for the blades 64 of the lower cutter element 20 not only raises bent grass blades but more importantly brings the weed growth into the severing plane to greatly reduce the spreading thereof.

As hereinabove described, the mowing machine 14, as constructed in accordance with this invention, is placed in operation upon rearward motion of the lever 104, pivoted on the handle bar 94, and which is adapted to swing the pulley 108 upward by means of the yoke 105. Increased tension of the belt 40 between the motor drive pulley 38 and pulley 38 on the shaft 36 causes the shaft 36 to rotate thus driving the belt 74 and consequently the pulleys 72 and 73. Since the belt 74 is trained about the idler pulley 75, the pulley 72 will operate the cutter element 19 of the cutting assembly in a clockwise direction while the pulley 73 will rotate the cutter element 20 in a counter clockwise direction. Also since the pulley 72 is of a smaller diameter, as above mentioned, than the pulley 73, the rate of rotation of the cutter element 19 will be more rapid. Now, when the mowing machine is to be self-propelled forwardly, the lever 98 is moved forwardly to swing the yoke 50 increasing the effective tension in the belt 43 and thereby driving the double pulley 44 from the pulley 41 on operating shaft 36. This driving influence is reflected in rotation of the sprocket 59 on axle 33 whereupon the traction rollers 17 will be caused to move the mowing machine forwardly across the lawn which is to be cut.

In the event that the cutting plane is found unsuitable, i.e. either too high or two low for the standing height of grass to be left, the set-screw 71 can be loosened thereby enabling the sleeve 70 to be raised or lowered within the hollow column 22. This will adjust the elevation or cutting plane of the cutter elements 19 and 20 with reference to the grass or the earth over which the mowing machine is to be operated.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:

1. In a rotary type lawn mower, a cutting assembly comprising a vertically disposed rotatable shaft, a first disc non-rotatably and concentrically attached to the lower end of said shaft and having top and bottom surfaces, a plurality of elongated cutter blades carried by said disc, each cutter blade comprising a cutting portion having a cutting edge and a mounting portion offset with respect to the cutting portion, means for securing the mounting portion of each cutter blade to the bottom surface of said disc to position the cutting edge of said cutter blade in parallel relation to a diametric line through the axis of said disc and in a plane parallel with the top surface of said disc, a hollow hub rotatably received upon said shaft, a second disc non-rotatably and concentrically attached to the lower end of said hub, said second disc being of the same diameter as said first disc and having top and bottom surfaces, a plurality of elongated cutter blades carried by said second disc, each cutter blade comprising a cutting portion having a cutting edge and a mounting portion offset with respect to the cutting portion, means for securing the mounting portion of each of said second-mentioned cutter blades to the top surface of said second disc to position the cutting edge of said cutter blade in angular relation to a diametric line through the axis of said second disc and in a plane parallel with the bottom surface of said second disc, and means for driving said shaft and hub to rotate said first and second discs in opposite directions to effect a scissor-like action between the cutting edges of the cutter blades carried by said first and second discs.

2. In a rotary type lawn mower, a cutting assembly comprising a vertically disposed rotatable shaft, a first disc non-rotatably and concentrically attached to the lower end of said shaft, a plurality of elongated cutter blades having cutting edges, means for detachably securing the cutter blades in fixed position to said disc so that they project radially therefrom in circularly spaced relation to one another, each of said cutter blades being arranged in parallel relation to a diametric line through the axis of said disc, a hollow hub rotatably received upon said shaft, a second disc non-rotatably and concentrically attached to the lower end of said hub, a plurality of elongated cutter blades having cutting edges, means for detachably securing said cutter blades in fixed position to said second disc so that they project radially therefrom in circularly spaced relation to one another, each of said second-mentioned cutter blades being arranged in angular relation to a diametric line through the axis of said second disc, means for driving said shaft and hub to rotate said first and second discs in opposite directions to effect a scissor-like action between the cutting edges of the cutter blades carried by said first and second discs, and a plurality of substantially vertically disposed fingers carried by the cutter blades secured to said first-mentioned disc and projecting downwardly therefrom to operate as raking elements upon rotation of said disc.

3. In a rotary type lawn mower, a cutting assembly comprising a vertically disposed rotatable shaft, a first disc non-rotatably and concentrically attached to the lower end of said shaft and having a flat upper surface, a plurality of elongated cutter blades, means for detachably securing the cutter blades in fixed position to said disc so that they project radially therefrom in circularly spaced relation to one another, each cutter blade being provided with a cutting edge arranged in parallel relation to a diametric line through the axis of said disc and located in a plane parallel with the upper surface of said disc, a hollow hub rotatably received upon said shaft, a second disc non-rotatably and concentrically attached to the lower end of said hub, said second disc having a flat bottom surface, a plurality of elongated cutter blades, means for detachably securing said cutter blades in fixed position to said second disc so that they project radially therefrom in circularly spaced relation to one another, each of said second-mentioned cutter blades being provided with a cutting edge arranged in angular relation to a diametric line through the axis of said second disc and located in a plane parallel with the bottom surface of said second disc, means for driving said saft and hub to rotate said first and second discs in opposite directions to effect a scissor-like action between the cutting edges of the cutter blades carried by said first and second discs, and a plurality of substantially vertically disposed fingers carried by the cutter blades secured to said first-mentioned disc and projecting downwardly therefrom to operate as raking elements upon rotation of said disc.

4. In a rotary type lawn mower, a supporting framework, a cutting assembly carried by said framework and comprising a vertically disposed rotatable shaft, a first disc non-rotatably and concentrically attached to the lower end of said shaft, a plurality of elongated cutter blades having cutting edges, means for detachably securing the cutter blades in fixed position to said disc so that they project radially therefrom in circularly spaced relation to one another, each of said cutter blades being arranged in parallel relation to a diametric line through the axis of said disc, a hollow hub rotatably received upon said shaft, a second disc non-rotatably and concentrically attached to the lower end of said hub, a plurality of elongated cutter blades having cutting edges, means for detachably securing said cutter blades in fixed position to said second disc so that they project radially therefrom in circularly spaced relation to one another, each of said second-mentioned cutter blades being arranged in angular relation to a diametric line through the axis of said second disc, means for driving said shaft and hub to rotate said first and second discs in opposite directions to effect a scissor-like action between the cutting edges of the cutter blades carried by said first and second discs, and means carried by said framework and disposed in the path of the grass cut by the cutting assembly for directing the cuttings back into the path of the cutter blades.

5. In a rotary type lawn mower, a supporting framework, a cutting assembly carried by said framework and comprising a vertically disposed rotatable shaft, a first disc non-rotatably and concentrically attached to the lower end of said shaft and having a flat upper surface, a plurality of elongated cutter blades, means for detachably securing the cutter blades in fixed position to said disc so that they project radially therefrom in circularly spaced relation to one another, each cutter blade being provided with a cutting edge arranged in parallel relation to a diametric line through the axis of said disc and located in a plane parallel with the upper surface of said disc, a hollow hub rotatably received upon said shaft, a second disc non-rotatably and concentrically attached to the lower end of said hub, said second disc having a flat bottom surface, a plurality of elongated cutter blades, means for detachably securing said cutter blades in fixed position to said second disc so that they project radially therefrom in circularly spaced relation to one another, each of said second-mentioned cutter blades being provided with a cutting edge arranged in angular relation to a diametric line through the axis of said second disc and located in a plane parallel with the bottom surface of said second disc, means for driving said shaft and hub to rotate said first and second discs in opposite directions to effect a scissor-like action between the cutting edges of the cutter blades carried by said first and second discs, and curved shields carried by said framework and disposed in the path of the grass cut by the cutting assembly for directing the cuttings back into the path of the cutter blades.

6. In a rotary type lawn mower, a supporting framework, a cutting assembly carried by said framework and comprising a vertically disposed rotatable shaft, a first disc non-rotatably and concentrically attached to the lower end of said shaft and having top and bottom surfaces, a plurality of elongated cutter blades carried by said disc, each cutter blade comprising a cutting portion having a cutting edge and a mounting portion, means for fixedly securing the mounting portion of each cutter blade to the said disc to position the cutting edge of said cutter blade in parallel relation to a diametric line through the axis of said disc and in a plane parallel with the top surface of said disc, a hollow hub rotatably received upon said shaft, a second disc non-rotatably and concentrically attached to the lower end of said hub, said second disc having top and bottom surfaces, a plurality of elongated cutter blades carried by said second disc, each cutter blade comprising a cutting portion having a cutting edge and a mounting portion, means for fixedly securing the mounting portion of each of said second-mentioned cutter blades to said second disc to position the cutting edge of said cutter blade in angular relation to a diametric line through the axis of said second disc and in a plane parallel with the bottom surface of said second disc, means for driving said shaft and hub to rotate said first and second discs in opposite directions to effect a scissor-like action between the cutting edges of the cutter blades carried by said first and second discs, a guard ring carried by said framework and encircling the cutting assembly, and arcuately shaped shields carried by said guard ring and disposed in the path of the grass cut by the cutting assembly for directing the cuttings back into the path of the cutter blades.

7. In a rotary type lawn mower, a supporting framework, a cutting assembly carried by said framework and comprising a vertically disposed rotatable shaft, a first disc non-rotatably and concentrically attached to the lower end of said shaft and having top and bottom surfaces, a plurality of elongated cutter blades carried by said disc, each cutter blade comprising a cutting portion having a cutting edge and a mounting portion offset with respect to the cutting portion, means for securing the mounting portion of each cutter blade to the bottom surface of said disc to position the cutting edge of said cutter blade in parallel relation to a diametric line through the axis of said disc and in a plane parallel with the top surface of said disc, a hollow hub rotatably received upon said shaft, a second disc non-rotatably and concentrically attached to the lower end of said hub, said second disc being of the same diameter as said first disc and having top and bottom surfaces, a plurality of elongated cutter blades carried by said second disc, each cutter blade comprising a cutting portion having a cutting edge and a mounting portion offset with respect to the cutting portion, means for securing the mounting portion of each of said second-mentioned cutter blades to the top surface of said second disc to position the cutting edge of said cutter blade in angular relation to a diametric line through the axis of said second disc and in a plane parallel with the bottom surface of said second disc, means for driving said shaft and hub to rotate said first and second discs in opposite directions to effect a scissor-like action between the cutting edges of the cutter blades carried by said first and second discs, a guard ring carried by said framework and encircling the cutting assembly, and a plurality of plate-like arcuately shaped shields, each having one end thereof secured to the guard ring and the other end spaced inwardly from said guard ring so that said shields are eccentrically positioned with respect to the axis of rotation of the cutter blades to direct the grass cuttings back into the path of said cutter blades.

References Cited in the file of this patent

UNITED STATES PATENTS

| | | |
|---|---|---|
| 222,626 | Gates | Dec. 16, 1879 |
| 2,028,784 | Jennett | Jan. 28, 1936 |
| 2,691,264 | Miller | Oct. 12, 1954 |